US012606497B2

(12) United States Patent
Magnant et al.

(10) Patent No.: US 12,606,497 B2
(45) Date of Patent: Apr. 21, 2026

(54) SYSTEMS AND METHODS FOR LIMITING VOID FORMATION IN CERAMIC MATRIX COMPOSITE COMPONENTS

(71) Applicant: General Electric Company, Schenectady, NY (US)

(72) Inventors: Jerome Geoffrey Magnant, Rexford, NY (US); Daniel Gene Dunn, Guilderland, NY (US); Jared Hogg Weaver, Clifton Park, NY (US); Paul Edward Gray, North East, MD (US); Gregory Allen Willis, Middletown, OH (US); Daniel P. Ivkovich, Fairfield, OH (US)

(73) Assignee: General Electric Company, Evendale, OH (US)

( * ) Notice: Subject to any disclaimer, the term of this patent is extended or adjusted under 35 U.S.C. 154(b) by 69 days.

(21) Appl. No.: 18/637,706

(22) Filed: Apr. 17, 2024

(65) Prior Publication Data

US 2025/0326698 A1     Oct. 23, 2025

(51) Int. Cl.
| | |
|---|---|
| *C04B 41/85* | (2006.01) |
| *B29C 73/02* | (2006.01) |
| *C04B 41/45* | (2006.01) |
| *C04B 41/50* | (2006.01) |

(52) U.S. Cl.
CPC .......... *C04B 41/457* (2013.01); *B29C 73/025* (2013.01); *C04B 41/5006* (2013.01); *C04B 41/5096* (2013.01); *C04B 2235/428* (2013.01); *C04B 2235/616* (2013.01)

(58) Field of Classification Search
CPC ....... B29C 73/02; B29C 73/025; B29C 73/24;
B29C 73/34; C04B 41/457; C04B 41/5006; C04B 41/5096; C04B 41/85; C04B 2235/428; C04B 2235/616
USPC ......... 264/36.18, 259, 279, 332; 425/11, 13, 425/110
See application file for complete search history.

(56) References Cited

U.S. PATENT DOCUMENTS

| | | | |
|---|---|---|---|
| 4,737,328 A | 4/1988 | Morelock | |
| 6,403,158 B1 | 6/2002 | Corman | |
| 9,701,072 B2 | 7/2017 | Corman | |
| | (Continued) | | |

FOREIGN PATENT DOCUMENTS

| | | |
|---|---|---|
| CN | 102219518 B | 5/2013 |
| CN | 109180185 A | 1/2019 |

*Primary Examiner* — Leo B Tentoni
(74) *Attorney, Agent, or Firm* — Dority & Manning, P.A.

(57) ABSTRACT

A method for limiting void formation in a melt-infiltrated ceramic matrix composite (MI-CMC) component includes arranging one or more infiltrant feedstocks in fluid communication with a targeted area of the MI-CMC component. The one or more infiltrant feedstocks have a nominal melting point at or below a nominal melting point of an alloy within the MI-CMC component. The method includes heating the one or more infiltrant feedstocks to a first temperature at or above the nominal melting point of the one or more infiltrant feedstocks to form a molten phase. The method also includes infiltrating the targeted area of the MI-CMC component with the molten phase. As such, the molten phase reacts with a solid phase in the targeted area of the MI-CMC component. Further, the method includes cooling the MI-CMC component to a second temperature that is below the first temperature to solidify the molten phase.

20 Claims, 7 Drawing Sheets

(56)                References Cited

U.S. PATENT DOCUMENTS

| | | | |
|---|---|---|---|
| 9,884,789 | B2 | 2/2018 | Lazur |
| 10,597,335 | B2 | 3/2020 | Dunn et al. |
| 2009/0169738 | A1 | 7/2009 | Gray et al. |
| 2015/0115489 | A1* | 4/2015 | Corman .................. C04B 41/85 |
| | | | 264/36.18 |
| 2019/0366656 | A1 | 12/2019 | Roberts et al. |
| 2019/0376389 | A1 | 12/2019 | Roberts et al. |
| 2021/0078913 | A1 | 3/2021 | Podgorski et al. |
| 2022/0041519 | A1 | 2/2022 | Roberts et al. |

* cited by examiner

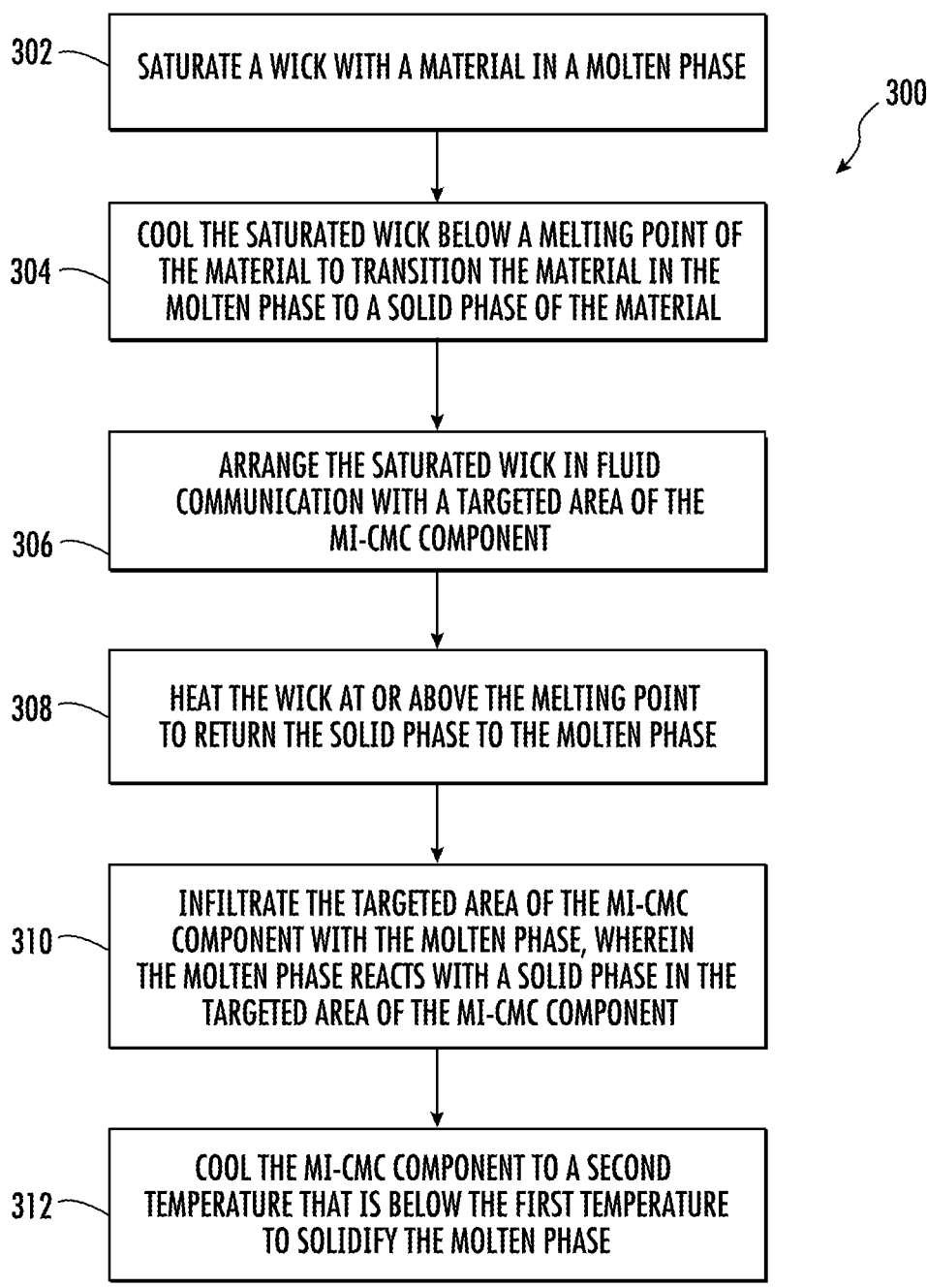

302 — SATURATE A WICK WITH A MATERIAL IN A MOLTEN PHASE

300

304 — COOL THE SATURATED WICK BELOW A MELTING POINT OF THE MATERIAL TO TRANSITION THE MATERIAL IN THE MOLTEN PHASE TO A SOLID PHASE OF THE MATERIAL

306 — ARRANGE THE SATURATED WICK IN FLUID COMMUNICATION WITH A TARGETED AREA OF THE MI-CMC COMPONENT

308 — HEAT THE WICK AT OR ABOVE THE MELTING POINT TO RETURN THE SOLID PHASE TO THE MOLTEN PHASE

310 — INFILTRATE THE TARGETED AREA OF THE MI-CMC COMPONENT WITH THE MOLTEN PHASE, WHEREIN THE MOLTEN PHASE REACTS WITH A SOLID PHASE IN THE TARGETED AREA OF THE MI-CMC COMPONENT

312 — COOL THE MI-CMC COMPONENT TO A SECOND TEMPERATURE THAT IS BELOW THE FIRST TEMPERATURE TO SOLIDIFY THE MOLTEN PHASE

FIG. 4

SYSTEMS AND METHODS FOR LIMITING VOID FORMATION IN CERAMIC MATRIX COMPOSITE COMPONENTS

FIELD

The present disclosure relates generally to ceramic matrix composite (CMC) components, and more particularly to systems and methods for limiting void formation in CMC components during formation and/or repair.

BACKGROUND

Ceramic matrix composites (CMCs), including CMCs that are reinforced with fibers, were developed to alleviate damage tolerance issues of monolithic ceramics such as silicon carbide (SiC) ceramics and have become attractive for high temperature structural applications, such as in gas turbine engines. One type of fiber-reinforced CMCs that is particularly attractive for high temperature structural applications is reactive melt infiltrated fiber-reinforced CMCs (hereinafter "MI-CMCs").

In MI-CMCs, a preform of fibers and matrix constituents is infiltrated with a molten material which produces a ceramic matrix when reacting with the matrix constituents. SiC-based MI-CMCs, wherein the infiltrating molten material is silicon, or a silicon alloy and the matrix constituents are such that the resulting matrix is substantially SiC (e.g., SiC and/or C particulates), are particularly attractive for high temperature structural applications because of their high thermal conductivity, excellent thermal shock resistance, creep resistance, and oxidation resistance compared to other CMCs.

BRIEF DESCRIPTION OF THE DRAWINGS

A full and enabling disclosure of the present embodiments, including the best mode thereof, directed to one of ordinary skill in the art, is set forth in the specification, which makes reference to the appended figures, in which:

FIG. 4 is a flow diagram of a method of limiting void formation in a MI-CMC component during formation and/or repair in accordance with one embodiment of the present disclosure.

Figure 1:
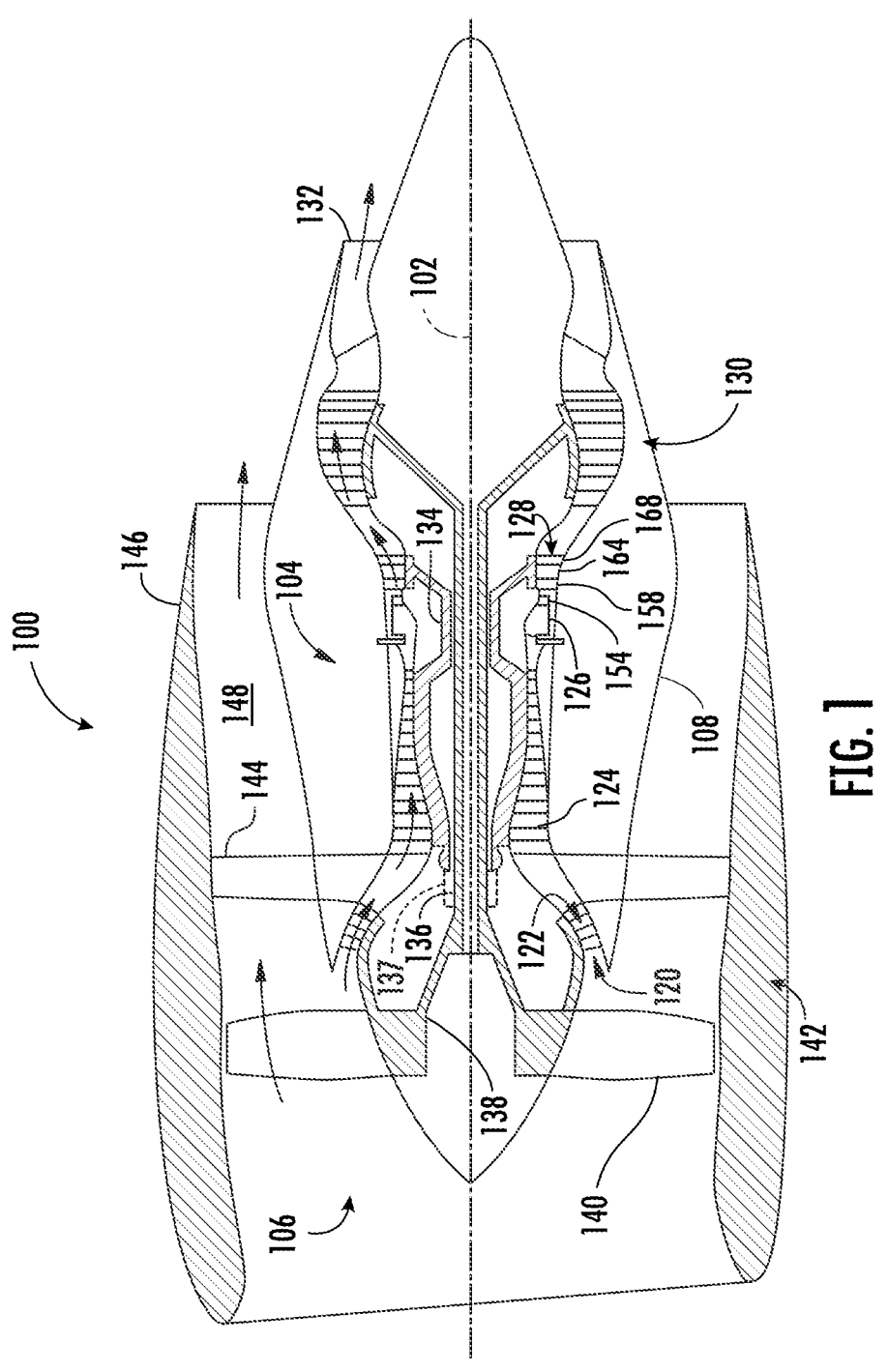
FIG. 1 is a cross-section of an exemplary gas turbine engine in accordance with one embodiment of the present disclosure.

Repeat use of reference characters in the present specification and drawings is intended to represent the same or analogous features or elements of the present invention.

DETAILED DESCRIPTION

Reference now will be made in detail to embodiments of the present disclosure, one or more examples of which are illustrated in the drawings. Each example is provided by way of explanation of the embodiments disclosed herein, not limitation thereof. In fact, it will be apparent to those skilled in the art that various modifications and variations can be made to the embodiments of the present disclosure without departing from the scope or spirit of the various embodiments described. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the term "nominal melting point" generally refers to the theoretical temperature at which a solid and liquid are in equilibrium. Furthermore, for a mechanical powder mixture, the nominal melting point of the overall mixture corresponds to the nominal melting point of the constituent powder with the lowest nominal melting point in the mixture. For example, in a silicon powder and boron powder mixture, the nominal melting point of the mixture is the nominal melting point of silicon as the silicon powder has a lower nominal melting point than the boron powder. In the case of an alloy, the nominal melting point corresponds to the solidus temperature of the alloy.

As used herein, a "eutectic composition" generally refers to a mixture of two or more phases at a particular composition of materials that have the lowest melting point, at which temperature the phases will simultaneously crystallize.

As used herein, ceramic matrix composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon, silicon carbide, zirconium carbide), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled or coated prior to inclusion within the matrix. For example, bundles of the fibers may be formed as a reinforced tape, such as a unidirectional reinforced tape. A plurality of the tapes may be laid up together to form a preform. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine, space vehicle structure, and propulsion components used in higher temperature sections, such as airfoils (e.g., turbines, and vanes), combustors, shrouds and other like components, nozzles, transition ducts, thermal protection systems, TPS, aerodynamic control surfaces and leading edges that would benefit from the lighter-weight and higher temperature capability these materials can offer.

It should be further understood that the CMC components and materials described herein are generally low ductility and low coefficient of thermal expansion materials. In addition, typically, CMC materials include a ceramic fiber, for example, a silicon carbide (SiC), forms of which are coated with a compliant material such as boron nitride (BN). The fiber materials may be coated in a ceramic type matrix, one form of which is silicon carbide (SiC). When formed into continuous-fiber plies, CMC materials have a characteristic wherein the tensile strength of the ply in the direction parallel to the length of the fibers (the "fiber direction") is stronger than the tensile strength in the direction perpendicular. This perpendicular direction may include matrix, interlaminar, secondary, or tertiary fiber directions. Various physical properties may also differ between the fiber and the matrix directions.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Conventional reactive melt infiltration manufacturing practices utilize wicks which are fibrous carbon felts, carbon fabrics, or carbon fibers strands to transport molten metal or alloy from an infiltrant feedstock to the fiber preform by means of capillary wetting. For example, the infiltrant feedstock is placed on one end of a carbon fiber felt/fabric, in close proximity to the fiber preform. The other end of the carbon felt/fabric contacts the preform. The infiltrant feedstock melts at its nominal melting point (ranging from about 1407° C. to about 1414° C. for pure silicon), forms a molten alloy with any alloying agents that were in the feedstock, and the molten alloy wets and infiltrates the carbon felt/fabric. Some examples of alloying agents are: Ge, Ti, Al, B, Cr, Co, Y, Zr. Since the fiber preform is also touching the carbon felt/fabric, the fiber preform is wet by the molten alloy, thereby absorbing the molten alloy by capillary action. As the preform absorbs the molten alloy of the silicon from the carbon felt/fabric, additional molten alloy is fed from the melting infiltrant feedstock until the fiber preform is fully saturated. Once the fiber preform is saturated and rendered dense, the molten alloy is allowed to cool and solidify to densify the MI-CMC component.

The infiltrant feedstock can be made from a powder, such as a pure metal powder or an un-alloyed powder mixture (herein referred to as an "infiltrant powder mixture" (e.g., containing pure silicon powder and an alloying agent powder such as boron)) that can be made into a shape using various techniques (e.g., pressing, casting, extrusion, etc.) and can be held together with an organic binder. In other examples, the infiltrant feedstock can be bulk material, such as an ingot, or other forms suitable for melt infiltration. During melt infiltration of silicon, the temperature of the infiltrant feedstock must first reach a nominal melting point of the silicon (about 1410 degrees Celsius (° C.)) to cause the molten alloy to form in a reasonable time. The resultant alloyed material has a nominal melting point which is lower (e.g., about 1385° C. when the silicon alloying element is boron at the eutectic composition) than the nominal melting point of the silicon in the infiltrant powder mixture from which it was formed.

In some instances, MI-CMC components may need to undergo a second melt infiltration process in which an additional source of molten alloy is provided. For example, a second melt infiltration process may be needed for MI-CMC components that are partially infiltrated (i.e., having some fully infiltrated regions with free silicon present and other infiltrated regions with little or no silicon and residual porosity). In this case, the partially infiltrated MI-CMC component can be re-infiltrated by the additional source of molten alloy during the second MI step, where the additional source of molten alloy from the infiltration feedstock completes the densification.

In another example, MI-CMC components that have been damaged can be repaired with new, un-infiltrated material. As an example, new material, such as fiber-reinforced plies, matrix plies, ceramic putty, or other materials, may be applied and bonded to an existing MI-CMC component to repair a damaged area. In this case, the un-infiltrated material in the repair area needs to be infiltrated by a molten metal or metallic alloy during the second MI step to densify the repaired area.

In another example, an MI-CMC component can be joined to another CMC component or to a monolithic ceramic by a melt infiltration technique. The pieces to be joined can be placed in contact with each other or a joining compound or paste can be used to fill the joint area. In some embodiments the joining compound comprises ceramic powders such as silicon carbide and carbon powder, resin that can be converted to carbon by pyrolysis treatment, polymer preceramic resin or fibers. In either case, the joint area generally needs to be densified to form a metallurgical bond between the parts by infiltrating with a molten metal or metal alloy during the second MI step.

However, when conventional manufacturing practices are used to perform a second MI step to re-work, repair, or join MI-CMC component, voids can form within previously dense regions therein. Without being bound by a specific theory, such voids are formed because existing alloy within the MI-CMC component are drained out by capillary actions by the non-infiltrated carbon wick attached to them. This may happen when the alloy within the MI-CMC component melts at a faster rate, or lower temperature, than the infiltrant.

Accordingly, and in view of the aforementioned, the present disclosure is directed to systems and methods for limiting void formation in MI-CMC components during a second MI step performed for re-working, repairing, or joining already-infiltrated MI-CMC components. In one embodiment, systems and methods of the present disclosure may utilize one or more wicks pre-saturated with an alloy, such as a silicon alloy, affixed to the fiber preform to prevent back-drawing of silicon alloy from the fiber preform where necessary. In a particular embodiment, a wick, which is pre-saturated with the same alloy contained within the MI-CMC component can be used to supply additional alloy without causing the formation of added porosity within the MI-CMC component as there is no capillary driving force with a wick already saturated by the molten alloy.

In some embodiments, an additional infiltrant feedstock is provided to the already saturated wick during the second MI step such that the wick does not become depleted as the second MI step progresses and the alloy contained in saturated wick moves from the wick to the portions of the CMC components that need to be filled by the alloy during the second MI. In these embodiments, this additional infiltrant feedstock has been designed such that it can provide a continuous flow of molten alloy to the wick as the second MI step progresses. In particular, if the wick becomes depleted in alloy during the second MI step, then there is a risk that the alloy contained in the already-infiltrated MI-CMC component can be drained out of the CMC component through capillary actions by the now depleted wick, leading to defects, such as voids, in the already-infiltrated MI-CMC component.

In cases where the amount of alloy contained within the saturated wick in contact with the MI-CMC component is below that needed by the MI-CMC component, additional alloy can be supplied to the saturated wick using several techniques. For example, such techniques may include arranging an additional infiltrant feedstock having a first nominal melting point (e.g., ranging from about 1407° C. to about 1414° C.) on the saturated wick. In such embodiments, the alloy in the MI-CMC component and the molten alloy in the saturated wick have a nominal melting point (e.g., 1385° C.) that is lower than the first nominal melting point (e.g., ranging from about 1407° C. to about 1414° C.) of the additional infiltrant feedstock. Thus, there is no driving force for the silicon alloy in the MI-CMC component to migrate to the saturated wick since the wick is already saturated with the same silicon alloy.

Another technique includes arranging an additional infiltrant feedstock having a first nominal melting point (e.g., ranging from about 1407° C. to about 1414° C.) on an unsaturated wick, with the pre-alloyed saturated wick being arranged on the unsaturated wick and in contact with the fiber preform. Further, the saturated wick is in fluid communication with the additional infiltrant feedstock. In such embodiments, the alloy in the MI-CMC component and the molten alloy in the saturated wick have a nominal melting point (e.g., 1385° C.) that is lower than the first nominal melting point (e.g., ranging from about 1407° C. to about 1414° C.) of the additional infiltrant feedstock. Thus, there is no driving force for the silicon alloy in the MI-CMC component to migrate to the saturated wick since the wick is already saturated with the same silicon alloy. Further, in an embodiment, the quantity of silicon alloy present in the saturated wick should be enough to not be depleted by absorption from the unsaturated wick.

Still another technique includes arranging an additional infiltrant feedstock on an unsaturated wick, with the saturated wick being arranged on the unsaturated wick and in fluid communication with the additional infiltrant feedstock. In such embodiments, the additional infiltrant feedstock has a nominal melting point (e.g., 1385° C.) substantially equal (e.g., +/−10 degrees) to that of the alloy in the MI-CMC component and the molten alloy in the saturated wick. In this example, the supplemental source of silicon alloy for repair or joining melts, e.g., at 1385° C., saturates the unsaturated wick before void formation in the component can occur, thereby allowing a saturated wick of a smaller size.

Yet another technique includes arranging a first infiltrant feedstock having a first composition with a first nominal melting point (e.g., ranging from about 1407° C. to about 1414° C.) and a second infiltrant feedstock having a second composition with a second nominal melting point (e.g., 1385° C.) in contact with each other on an unsaturated wick. Further, the saturated wick is arranged on the unsaturated wick and in contact with the fiber preform. Moreover, the saturated wick is in fluid communication with the first and second infiltrant feedstocks. In this example, the second composition of the second infiltrant feedstock may be a pre-alloyed eutectic composition that will start melting at the second nominal melting point (e.g., 1385° C.) to induce the melting of the first infiltrant feedstock before the first nominal melting point (e.g., ranging from about 1407° C. to about 1414° C.), thereby preventing void formation in the MI-CMC component.

Another technique includes arranging an additional infiltrant feedstock containing infiltrant pre-alloyed powder on an unsaturated wick, with the saturated wick being arranged on the unsaturated wick and in contact with the fiber preform. In such embodiments, the infiltrant pre-alloyed powder induces a lower infiltrant feedstock melting temperature. Moreover, in this example, the infiltrant pre-alloyed powder contained within the infiltrant feedstock starts melting at a first nominal melting point (e.g., 1385° C.) and induces the melting of the infiltrant feedstock before its nominal melting point (e.g., ranging from about 1407° C. to about 1414° C.). Thus, in an embodiment, such infiltrant feedstocks may also be used during the initial component infiltration to limit the needed ultimate infiltration temperature and reduce the component processing time. The infiltrant pre-alloyed powder is the metallurgical alloy that has a lower nominal melting point than that of the primary metal (e.g., silicon) in the infiltrant powder mixture. The infiltrant pre-alloyed powder can be in the form of a granular material (e.g., fine powders, grains, lumps, etc.), a bulk form of material (such as an ingot), or any other material form amenable to acting as a feedstock for the melt infiltration process.

Still another technique includes using a large (e.g., thicker) saturated felt to supply the required silicon to the MI-CMC component. In this example, carbon felts saturated with the pre-alloyed material may be used to supply all of (or a majority of) the molten alloy needed by the component and does not require any additional infiltrant feedstocks or unsaturated wicks. In certain embodiments, woven fabric wicks are typically less than 3 millimeters (mm) thick, whereas carbon felts (wicks) can be up to 25 mm thick. In certain embodiments, saturated fabrics or felts may be utilized as a silicon source depending on the alloy requirements of the CMC preform. For example, in an embodiment, felts, owing to their thicker cross-section and porosity, can hold more alloy per unit area than fabrics and are preferred where a larger weight of alloy is needed to infiltrate preforms.

Referring now to the drawings, FIG. 1 illustrates a schematic cross-sectional view of a gas turbine engine in accordance with one embodiment of the present disclosure. Although further described below generally with reference to a turbofan engine 100, the present disclosure is also applicable to turbomachinery in general, including turbojet, turboprop, and turboshaft gas turbine engines, including industrial and marine gas turbine engines and auxiliary power units.

As shown in FIG. 1, the turbofan engine 100 has a longitudinal or axial centerline axis 102 that extends therethrough for reference purposes. In general, the turbofan engine 100 may include a core engine 104 disposed downstream from a fan section 106.

The core engine 104 may generally include a substantially tubular outer casing 108 that defines an annular inlet 120. The outer casing 108 may be formed from multiple casings. The outer casing 108 encases, in serial flow relationship, a compressor section having a booster or low pressure (LP) compressor 122, a high pressure (HP) compressor 124, a combustion section 126, a turbine section including a high pressure (HP) turbine 128, a low pressure (LP) turbine 130, and a jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122. The LP spool 136 may also be connected to a fan spool or shaft 138 of the fan section 106. In particular embodiments, the LP spool 136 may be connected directly to the fan spool 138 such as in a direct-drive configuration. In alternative configurations, the LP spool 136 may be connected to the fan spool 138 via a speed reduction device 137 such as a reduction gear gearbox in an indirect-drive or geared-drive configuration. Such speed reduction devices may be included between any suitable shafts/spools within the turbofan engine 100 as desired or required.

As shown in FIG. 1, the fan section 106 includes a plurality of fan blades 140 that are coupled to and that extend radially outwardly from the fan spool 138. An annular fan casing or nacelle 142 circumferentially surrounds the fan section 106 and/or at least a portion of the core engine 104. It should be appreciated by those of ordinary skill in the art that the nacelle 142 may be configured to be supported relative to the core engine 104 by a plurality of circumferentially spaced outlet guide vanes 144. Moreover, a downstream section 146 of the nacelle 142 (downstream of the guide vanes 144) may extend over an outer portion of the core engine 104 so as to define a bypass airflow passage 148 there between.

The HP turbine 128 includes, in serial flow relationship, a first stage of stator vanes 154 (only one shown) axially spaced from turbine rotor blades 158 (only one shown) and a second stage of stator vanes 164 (only one shown) axially spaced from turbine rotor blades 168 (only one shown).

Figure 2:
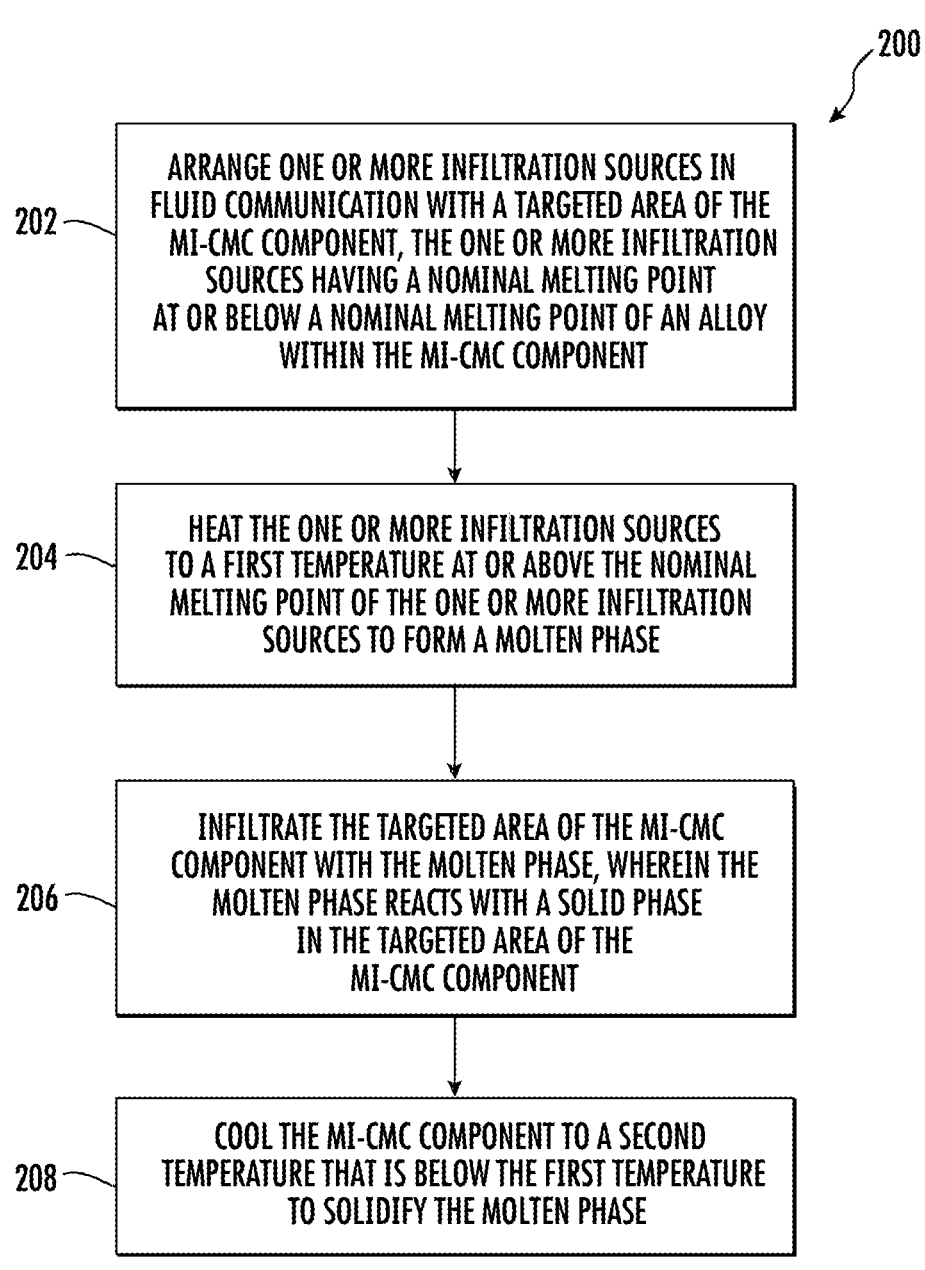
FIG. 2 is a flow diagram of a method of limiting void formation in a MI-CMC component during formation and/or repair in accordance with one embodiment of the present disclosure.

Referring now to FIG. 2, a flow diagram of an embodiment of a method 200 of limiting void formation in a MI-CMC component, such as an MI-CMC component that can be used in the turbofan engine 100 described herein, is provided. In particular, the method 200 can be used to repair and/or form any of the components described herein with respect to the turbofan engine 100 or any other CMC component configuration such as CMC liners, CMC shrouds, CMC nozzles, CMC blades, etc. However, it should be appreciated that the exemplary method 200 is discussed herein only to describe exemplary aspects of the present disclosure and is not intended to be limiting. Further, though FIG. 2 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure.

As shown at (202), the method 200 includes arranging one or more infiltration sources in fluid communication with a targeted area of the MI-CMC component, the one or more infiltration sources having a nominal melting point at or below a nominal melting point of an alloy within the MI-CMC component. In such embodiments, for example, the infiltration source(s) may include one or more infiltrant feedstocks containing a silicon-based material and an infiltrant pre-alloyed material. Thus, in an embodiment, the method 200 may include forming the infiltrant feedstock(s) of an infiltrant powder mixture. More specifically, the infiltrant powder mixture may include a silicon-based material (e.g., silicon), an additive material (such as a boron-containing additive material), and an infiltrant pre-alloyed material. In an embodiment, for example, the infiltrant pre-alloyed material may be an infiltrant pre-alloyed powder (e.g., a eutectic Si—B alloy). Thus, in an embodiment, the infiltrant feedstock(s) can be formed of the silicon-based powder and the additive powder, with at least a portion of the infiltrant feedstock(s) including an amount of the infiltrant pre-alloyed powder. In particular embodiments, examples of the feedstock compositions may include 0-95 weight percent (wt %) of silicon powder, 2-70 wt % of the following additive materials: B, SiB6, SiB3, B4C, Ti, TiSi2, Hf, HfSi2, Cr, CrSi2, Zr, ZrSi2, Co, CoSi2, Y, Si3Y5, and 5-100 wt % of the infiltrant pre-alloyed material containing eutectic Si—B, Si—Ti, Si—Hf, Si—Cr, Si—Zr, Si—Co, Si—Y. As a particular example, the feedstock composition may include 4 wt % of B4C powder+46 wt % of silicon-boron (Si—B) eutectic in a granular form, such as a powder form+50 wt % of silicon powder. The resulting infiltrant feedstock has a nominal melting point of 1385° C.

As shown at (204), the method 200 includes heating the one or more infiltration sources to a first temperature at or above the nominal melting point of the one or more infiltration source(s) to form a molten phase. For example, in an embodiment, the nominal melting point of the infiltrant feedstock is less than about 1400 degrees Celsius (° C.), preferably between 1340° C. and 1385° C. In addition, the nominal melting point of the infiltrant feedstock is less than or equal to the nominal melting point of the alloy within the MI-CMC component. As shown at (206), the method 200 includes infiltrating the targeted area of the MI-CMC component with the molten phase, wherein the molten phase reacts with a solid phase of an alloy in the targeted area of the MI-CMC component. The solid phase typically includes carbon materials, e.g., in the form of carbon black or pyrolytic carbon, formed by pyrolysis of a material like, for example, phenolic resin or furfuryl-alcohol resin. As shown at (208), the method 200 includes cooling the MI-CMC component to a second temperature that is below the first temperature to solidify the molten phase to repair or form the MI-CMC component.

Figures 3A, 3B:
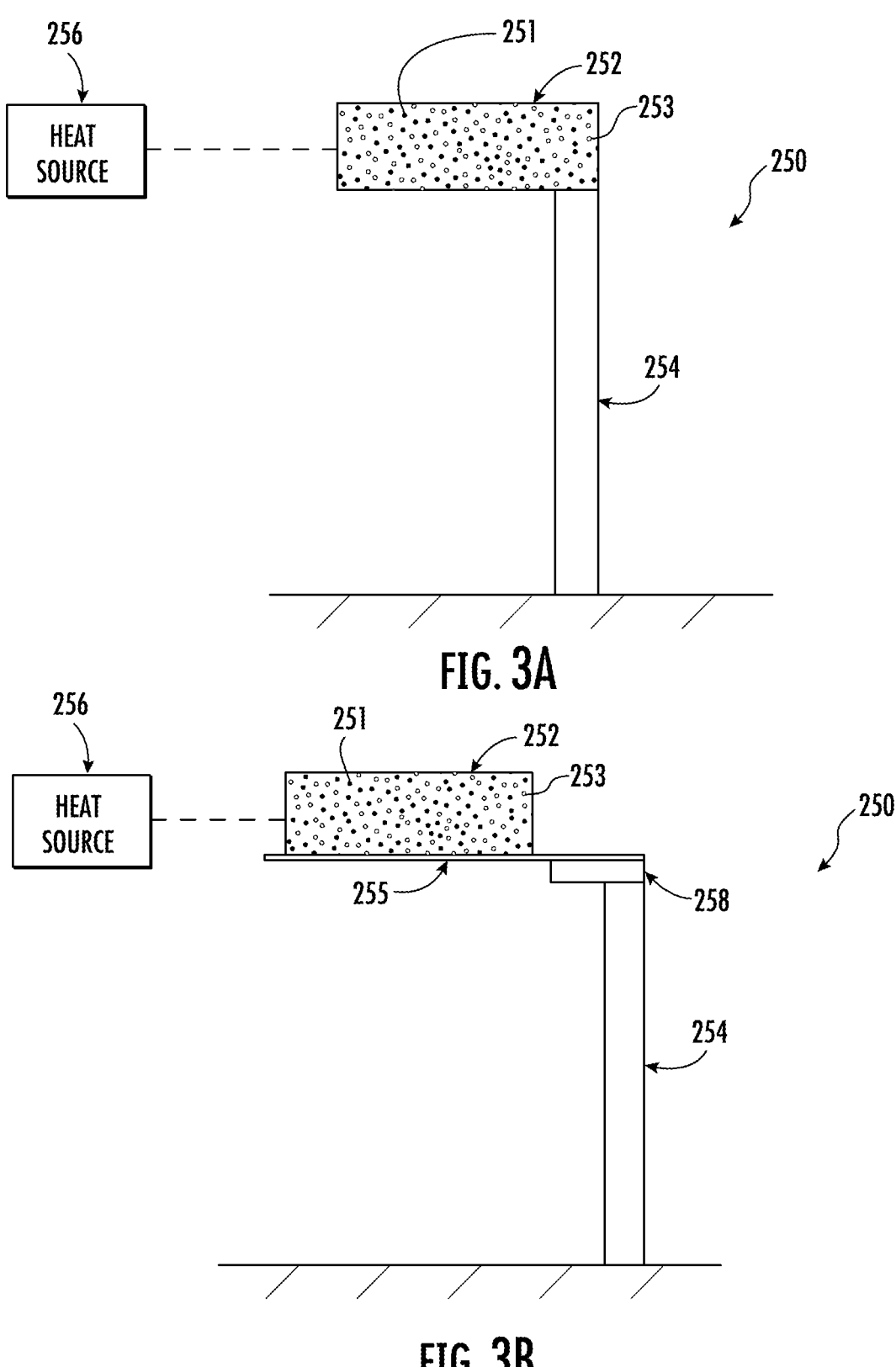
FIG. 3A is a schematic diagram of a system for repairing or forming a MI-CMC component to limit void formation during formation and/or repair in accordance with one embodiment of the present disclosure.
FIG. 3B is a schematic diagram of a system for repairing or forming a MI-CMC component to limit void formation during formation and/or repair in accordance with one embodiment of the present disclosure.

The method 200 of FIG. 2 can be better understood with respect to FIGS. 3A and 3B. In particular, as shown, schematic diagrams of embodiments of a system 250 for repairing or forming a MI-CMC component according to the present disclosure are illustrated. More specifically, as shown in FIGS. 3A and 3B, the system 250 includes an infiltrant feedstock 252 formed of an infiltrant powder mixture 253 and an infiltrant pre-alloyed powder 251. Further, as shown, at least in the instance of a repair, the system 250 includes a fiber preform 254 of the MI-CMC component. The fiber preform 254, for example, may be a partially infiltrated preform or a preform undergoing infiltration repair and/or a CMC component under repair that contains a repair patch. In addition, as shown, the system 250 includes a heat source 256 for heating the infiltrant feedstock to a first temperature to form a molten phase, wherein the infiltrant pre-alloyed powder has a lower melting point than the infiltrant powder mixture, thereby lowering a nominal melting point of the infiltrant feedstock 252. As such, the molten phase infiltrates the fiber preform 254 of the MI-CMC component using capillary forces and reacts with a solid phase of the fiber preform 254 to consolidate the fiber preform. The MI-CMC component can then be cooled to a second temperature that is below the first temperature to solidify the molten phase to repair or form the MI-CMC component.

In certain embodiments, as shown in FIG. 3A, the infiltrant feedstock 252 may be used without additional wicks. In another embodiment, as shown in FIG. 3B, the infiltrant feedstock 252 may be used in combination with an unsaturated wick 255 and a saturated wick 258, i.e., a wick saturated with a molten phase of the silicon-based alloy. Moreover, as shown, the saturated wick 258 may be arranged between the infiltrant feedstock 252 and the fiber preform 254 of the MI-CMC component.

Accordingly, in an embodiment, the method 200 may include delivering the molten phase of the infiltrant feedstock 252 before the unsaturated wick 255 can draw molten alloy away from the fiber preform 254 and create additional porosity. Furthermore, in an embodiment (FIG. 3B), the lower nominal melting point of the infiltrant feedstock 252 enables the molten phase of the infiltrant feedstock 252 to be delivered to the fiber preform 254 sooner than a molten phase of an infiltrant feedstock without the infiltrant pre-alloyed powder.

Referring now to FIG. 4, a flow diagram of an embodiment of a method 300 of limiting void formation of a MI-CMC component, such as an MI-CMC component that can be used in the turbofan engine 100 described herein, is provided. In particular, the method 300 can be used with respect to any of the components described herein with respect to the turbofan engine 100 or any other CMC component configuration. However, it should be appreciated that the exemplary method 300 is discussed herein only to describe exemplary aspects of the present disclosure and is not intended to be limiting. Further, though FIG. 4 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure.

As shown at (302), the method 300 includes saturating a wick with an alloy in a molten phase. For example, in an embodiment, saturating the wick may be completed by placing the infiltrant feedstock (e.g., infiltrant powder mixture, infiltrant pre-alloyed powder, or both) in fluid communication with the wick that needs to be infiltrated, then raising the temperature to a melting point of the infiltrant feedstock(s) and maintaining the temperature at this melting point to allow the molten alloy to flow toward the wick and infiltrate it. As shown at (304), the method 300 includes cooling the wick below a melting point of the alloy to transition the metal alloy in the molten phase to a solid phase of the alloy. As shown at (306), the method 300 includes arranging the saturated wick in fluid communication with a targeted area of the MI-CMC component. As shown at (308), the method 300 includes heating the wick at or above the melting point to return the solid phase to the molten phase. As shown at (310), the method 300 includes infiltrating the targeted area of the MI-CMC component with the molten phase, e.g., using capillary forces, wherein the molten phase reacts with a solid phase, such as carbon, in the targeted area of the MI-CMC component. As shown at (312), the method 300 includes cooling the MI-CMC component to a second temperature that is below the first temperature to solidify the molten phase.

The method 300 of FIG. 4 can be better understood with respect to FIG. 5-10. In particular, as shown, schematic diagrams of various embodiments of a system for limiting void formation of a MI-CMC component according to the present disclosure are illustrated. In particular, in cases where the amount of alloy contained within the saturated wick in contact with the MI-CMC component is below that needed by the MI-CMC component, additional alloy can be supplied to the saturated wick using various techniques, such as those illustrated in FIGS. 5-10.

Figure 5:
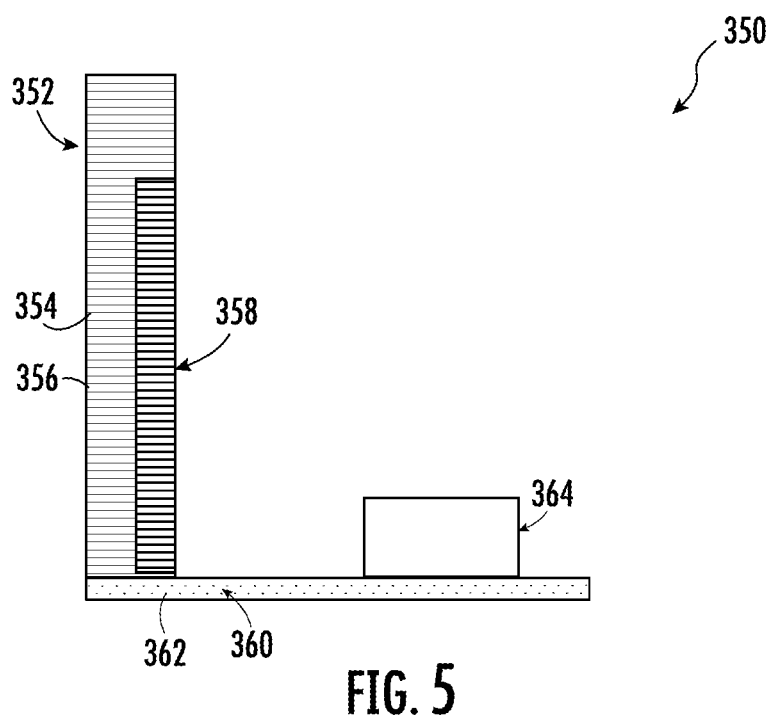
FIG. 5 is a schematic diagram of a system for repairing or forming a MI-CMC component to limit void formation in accordance with one embodiment of the present disclosure.

In particular, as shown in FIGS. 5-10, schematic diagrams of different embodiments of a system 350 for repairing or forming a MI-CMC component 352 to limit void formation according to the present disclosure are illustrated. More specifically, as shown in FIG. 5, the MI-CMC component 352 is generally formed of a fiber preform 354 melt infiltrated with a silicon alloy 356. The fiber preform 354, for example, may be a partially infiltrated preform or a preform undergoing infiltration repair or two ceramic components that are joined together by melt infiltration, whereas at least one of the components is a melt infiltrated component and another of the components may be a monolithic ceramic or a CMC component. For example, in an embodiment, if the MI-CMC component 352 becomes damaged, a CMC repair patch 358 may be used to repair the MI-CMC component 352. In particular embodiments, the repair patch may need to be melt-infiltrated, which, in most of the cases requires re-heating the repair patch and the original component to a temperature at or above the melting point of the infiltrating metal or metal alloy. Further, in an embodiment, the repair patch may include fiber plies or a mix of powders, such as silicon carbide and carbon powder, or a carbon resin precursor that forms carbon after pyrolysis treatment or a pre-ceramic polymer, such as polycarbosilane, polycarbosiloxane, or a mixture thereof.

Furthermore, as shown, a saturated wick 360 may be arranged adjacent to the fiber preform 354. Accordingly, in cases where the amount of molten alloy contained within saturated wick 360 in contact with the MI-CMC component 352 is below that needed by the MI-CMC component 352, additional alloy can be supplied to the saturated wick 360 using various techniques. For example, as shown in FIG. 5, an example technique may include arranging a first infiltrant feedstock 364 having a first nominal melting point (e.g., ranging from about 1407° C. to about 1414° C.) on the saturated wick 360. For example, in an embodiment, the first infiltrant feedstock 364 may be composed of Si powder and B4C powder. As such, the saturated wick 360 is configured to transport molten silicon alloy 362 from the first infiltrant feedstock 364 by means of capillary wetting. In such embodiments, the alloy in the MI-CMC component 352 and the molten alloy in the saturated wick 360 have a nominal melting point (e.g., 1385° C.) that is lower than the first nominal melting point (e.g., ranging from about 1407° C. to about 1414° C.) of the first infiltrant feedstock 364. Thus, there is no driving force for the silicon alloy in the MI-CMC component 352 to migrate to the saturated wick 360 since the wick 360 is already saturated with the same molten alloy.

Figure 6:
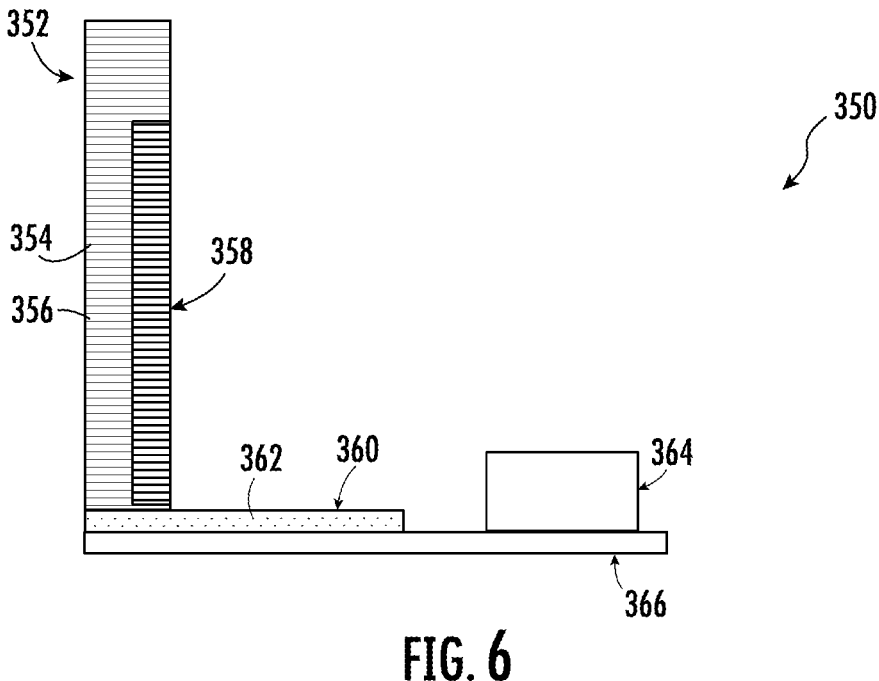
FIG. 6 is a schematic diagram of a system for repairing or forming a MI-CMC component to limit void formation in accordance with one embodiment of the present disclosure.

Referring now to FIG. 6, wherein common numbering refers to the same features as described with respect to FIG. 5, another technique for supplying additional alloy to the saturated wick 360 in cases where the amount of molten alloy contained within saturated wick 360 is below that needed by the MI-CMC component 352 includes arranging the first infiltrant feedstock 364 having the first nominal melting point (e.g., ranging from about 1407° C. to about 1414° C.) on an unsaturated wick 366. Further, as shown, the saturated wick 360 may be arranged on the unsaturated wick 366 adjacent to the first infiltrant feedstock 364. Moreover, as shown, the saturated wick 360 may be in contact with the fiber preform 354 and in fluid communication with the first infiltrant feedstock 364, e.g., via unsaturated wick 366. In such embodiments, the alloy in the MI-CMC component 352 and the molten alloy in the saturated wick 360 have a nominal melting point (e.g., 1385° C.) that is lower than the first nominal melting point (e.g., ranging from about 1407° C. to about 1414° C.) of the first infiltrant feedstock 364. Thus, there is no driving force for the silicon alloy in the MI-CMC component 352 to migrate to the saturated wick 360 since the wick 360 is already saturated with the same silicon alloy 362. Further, in an embodiment, the quantity of silicon alloy 362 present in the saturated wick 360 is enough to not be depleted by absorption from the unsaturated wick 366.

Figure 7:
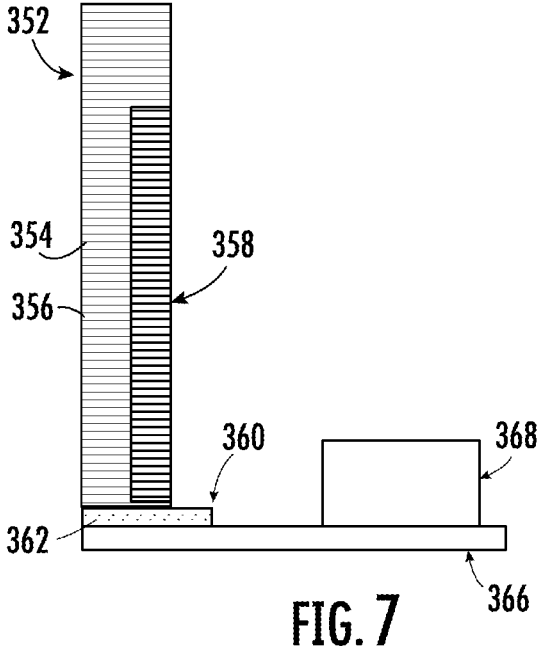
FIG. 7 is a schematic diagram of a system for repairing or forming a MI-CMC component to limit void formation in accordance with one embodiment of the present disclosure.

Referring now to FIG. 7, wherein common numbering refers to the same features as described with respect to FIG. 5, another technique for supplying additional alloy to the saturated wick 360 in cases where the amount of molten alloy contained within saturated wick 360 is below that needed by the MI-CMC component 352 includes arranging an infiltrant feedstock 368 having a nominal melting point (e.g., 1385° C.) on the unsaturated wick 366. Notably, the melting point of the infiltrant feedstock 368 is lower than the melting point of the first infiltrant feedstock 364 illustrated in FIGS. 5 and 6. In an embodiment, the infiltrant feedstock 368 is fabricated by heating an infiltrant powder mixture to its melting temperature and then allowing it to cool, thereby creating an infiltrant alloy. After cooling, the infiltrant alloy can be used as such or further crushed in the form of a granular material, such as an infiltrant pre-alloyed powder. Further, as shown, the saturated wick 360 may be arranged on the unsaturated wick 366 between the fiber preform 354 and the unsaturated wick 366. Moreover, as shown, the saturated wick 360 is in fluid communication with the infiltrant feedstock 368, e.g., via the unsaturated wick 366. In particular, in such embodiments, the infiltrant feedstock 368 has a nominal melting point (e.g., 1385° C.) substantially equal to that of the alloy in the MI-CMC component 352 and the molten alloy in the saturated wick 360. In this example, the supplemental source of silicon alloy for repair melts, e.g., at 1385° C., saturates the unsaturated wick 360 before void formation in the MI-CMC component 352 can occur, thereby allowing the saturated wick 360 to be of a smaller size, as shown.

Figure 8:
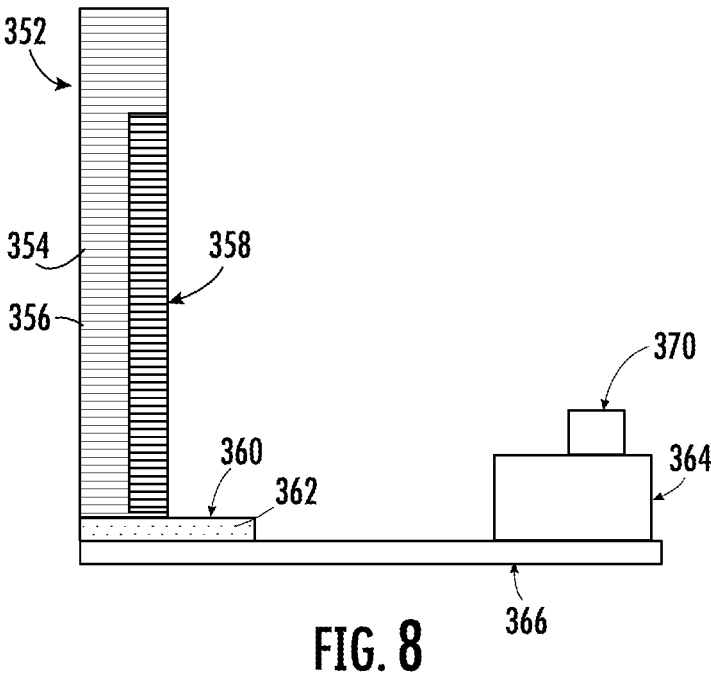
FIG. 8 is a schematic diagram of a system for repairing or forming a MI-CMC component to limit void formation in accordance with one embodiment of the present disclosure.

Referring now to FIG. 8, wherein common numbering refers to the same features as described with respect to FIG. 5, another technique for supplying additional alloy to the saturated wick 360 in cases where the amount of molten alloy contained within the saturated wick 360 is below that needed by the MI-CMC component 352 includes arranging the first infiltrant feedstock 364 having a first composition (such as Si and B4C powders) with a first nominal melting point (e.g., ranging from about 1407° C. to about 1414° C.) and a second infiltrant feedstock 370 having a second nominal composition (such as containing a eutectic alloy of Si and B) with a second melting point (e.g., 1385° C.) in contact with each other on the unsaturated wick 366. For example, as shown, the first and second infiltrant feedstocks 364, 370 may be stacked together on the unsaturated wick 366. Further, as shown, the saturated wick 360 is arranged on the unsaturated wick 366 between the fiber preform 354 and the unsaturated wick 366. Moreover, as shown, the saturated wick 360 is in fluid communication with the infiltrant feedstocks 364, 370, via the unsaturated wick 366. In this example, the composition of the second infiltrant feedstock 370 may contain a eutectic alloy that starts melting at the second melting point (e.g., 1385° C.) to induce the melting of the first infiltrant feedstock 364 before the first nominal melting point (e.g., ranging from about 1407° C. to about 1414° C.), thereby preventing void formation in the MI-CMC component 352.

Figure 9:
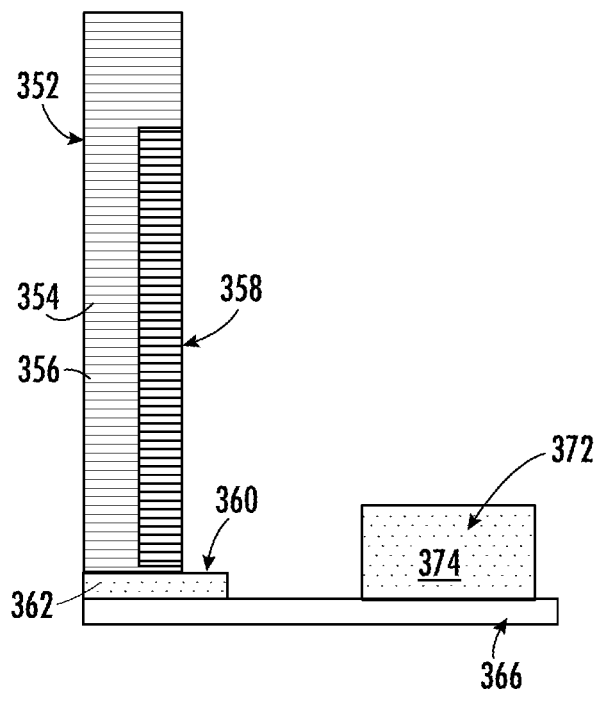
FIG. 9 is a schematic diagram of a system for repairing or forming a MI-CMC component to limit void formation in accordance with one embodiment of the present disclosure.

Referring now to FIG. 9, wherein common numbering refers to the same features as described with respect to FIG. 5, another technique for supplying additional alloy to the saturated wick 360 in cases where the amount of molten alloy contained within saturated wick 360 is below that needed by the MI-CMC component 352 includes arranging an infiltrant feedstock 372 containing infiltrant pre-alloyed powder 374 on the unsaturated wick 366. Further, as shown, the saturated wick 360 is arranged on the unsaturated wick 366 between the fiber preform 354 and the unsaturated wick 366. Further, the saturated wick 360 is in fluid communication with the infiltrant feedstock 372, e.g., via the unsaturated wick 366. In such embodiments, the infiltrant pre-alloyed powder 374 induces a lower nominal melting point of the infiltrant feedstock 372. Moreover, in this example, the infiltrant pre-alloyed powder 374 contained within the infiltrant feedstock 372 starts melting at a first nominal melting point (e.g., 1385° C.) and induces the melting of the infiltrant feedstock 372 before its nominal melting point (e.g., ranging from about 1407° C. to about 1414° C.). Thus, in an embodiment, such infiltrant feedstocks 372 may also be used during the initial component infiltration to limit the needed ultimate infiltration temperature and reduce component processing time.

Figure 10:
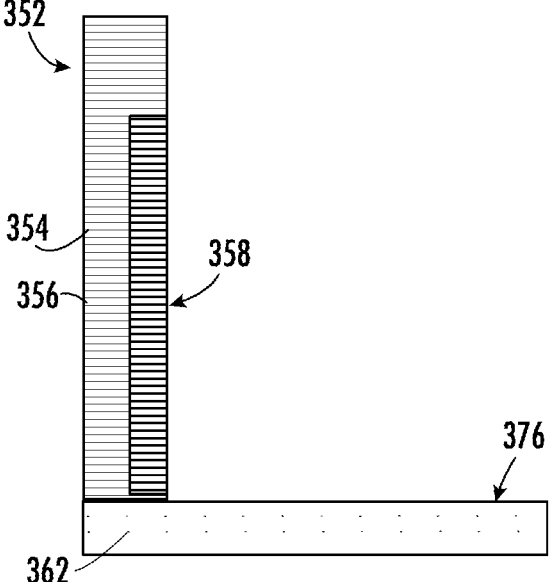
FIG. 10 is a schematic diagram of a system for repairing or forming a MI-CMC component to limit void formation in accordance with one embodiment of the present disclosure.

Referring now to FIG. 10, wherein common numbering refers to the same features as described with respect to FIG. 5, still another technique for supplying additional alloy to the MI-CMC component 352 includes using a large (e.g., thicker, wider) saturated wick 376 to supply the required silicon to the MI-CMC component 352. In this example, the large, saturated wick 376 may be used to supply the molten alloy and does not require any additional infiltrant feedstocks or unsaturated wicks. In another embodiment, the wick(s) 376, such as carbon felt wicks, can be from 5 mm to 25 mm in thickness.

Further non-limiting examples are provided herein below to further illustrate various embodiments of the present disclosure.

Example 1

A CMC component is densified by MI of pure silicon. The nominal melting point of the silicon metal within the CMC component is 1410° C. An infiltrant feedstock containing 100% pre-alloyed silicon-boron at the eutectic composition (around 13 at. % boron) is used to infiltrate the targeted area of the MI-CMC component. The infiltrant feedstock has a nominal melting point corresponding to the melting point of the Si—B eutectic at around 13 at % boron: 1385° C.

Example 2

A CMC component is densified by MI of pure silicon. The nominal melting point of the silicon metal within the CMC is 1410° C. An infiltrant feedstock containing 70 wt % silicon powder and 30 wt % pre-alloyed silicon-boron at the eutectic composition (around 13 at % boron) is used to infiltrate the targeted area of the MI-CMC component. The infiltrant feedstock has a nominal melting point corresponding to the melting point of the Si—B eutectic at around 13 at % boron: 1385° C.

Example 3

A CMC component is densified by MI of a mixture of silicon powder and boron powder. The nominal melting point of the alloy within the CMC component is thus the solidus point of the silicon boron eutectic (1385° C.). An infiltrant feedstock containing 60 wt % silicon powder and 40 wt % pre-alloyed silicon-boron at the eutectic composition is used to infiltrate the targeted area of the MI-CMC component. The infiltrant feedstock has a nominal melting point of around 1385° C.

Example 4

A CMC component is densified by MI of a mixture of silicon powder and boron powder. The nominal melting point of the alloy within the CMC is thus the solidus point of the silicon boron eutectic (1385° C.). An infiltrant feedstock containing 50 wt % of silicon powder+46 wt % of silicon-boron (Si—B) eutectic alloy in a granular form like a powder form+4 wt % of B4C additive powder is used to infiltrate the targeted area of the MI-CMC component. The infiltrant feedstock has a nominal melting point of around 1385° C.

Example 5

A CMC is densified by MI of a mixture of silicon powder and boron powder. The nominal melting point of the alloy within the CMC component is thus the solidus point of the silicon boron eutectic (1385° C.). An infiltrant feedstock containing 70 wt % silicon powder and 30 wt % pre-alloyed silicon-yttrium at the eutectic composition containing around 37 wt % Yttrium is used to infiltrate the targeted area of the MI-CMC component. The infiltrant feedstock has a nominal melting point corresponding to the melting point of the Si—Y eutectic at 37 wt % yttrium: 1242° C.

Example 6

Another example includes saturating a wick with a silicon-boron alloy in a molten phase, with this alloy containing 80 wt % of the silicon boron alloy at the Si—B eutectic composition. Further, the saturated wick is cooled below 1385° C. to transition the silicon-boron alloy to a solid phase. The saturated wick is then arranged in fluid communication with a targeted area of the MI-CMC component. Further, the saturated wick is heated to 1390° C. or above such that the targeted area of the MI-CMC component is infiltrated with the molten phase of the silicon-boron alloy, wherein the molten phase reacts with some carbon in the targeted area of the MI-CMC component to form some silicon carbide. Moreover, the MI-CMC component is cooled to a temperature below 1385° C.

Example 7

Still another example includes saturating a wick with a silicon-boron alloy in a molten phase, with this alloy containing 80 wt % of the silicon boron alloy at the Si—B eutectic composition. Further, the saturated wick is cooled below 1385° C. to transition silicon-boron alloy to a solid phase. The saturated wick is then arranged in fluid communication with a targeted area of the MI-CMC component. Further, an infiltrant feedstock is formed by pressing silicon powder and boron carbide powder together at a composition of around 93 wt % silicon+7 wt % boron carbide. The infiltrant feedstock is then arranged between the saturated wick and the targeted area. Moreover, the targeted area, the saturated wick, and the infiltrant feedstock are heated to temperature of 1390° C. or above. As such, the targeted area of the MI-CMC component is infiltrated with the molten phase of the silicon-boron alloy, wherein the molten silicon alloy reacts with some carbon in the targeted area of the MI-CMC component to form some silicon carbide. Further, the MI-CMC component is cooled to a temperature below 1385° C.

Example 8

Still another example includes saturating a wick with a silicon-boron alloy in a molten phase, with this alloy containing 80 wt % of the silicon boron alloy at the Si—B eutectic composition. Further, the saturated wick is cooled below 1385° C. to transition silicon-boron alloy to a solid phase. Further, the saturated wick is arranged in fluid communication with a targeted area of the MI-CMC component. Further, a first infiltrant feedstock is formed by pressing silicon powder and boron carbide powder together at a composition of around 93 wt % silicon+7 wt % boron carbide. The first infiltrant feedstock is then arranged between the saturated wick and the targeted area. In addition, a second infiltrant feedstock is formed by melting a mix of silicon and boron carbide powder at the composition of around 93 wt % silicon+7 wt % boron carbide and then cooled down below 1385° C. The second infiltrant feedstock is then placed in fluid communication with the first infiltrant feedstock. Further, the targeted area, the saturated wick, and the first and second infiltrant feedstocks are heated to a temperature of 1390° C. or above. Further, the targeted area of the MI-CMC component is infiltrated with the molten phase of the silicon-boron alloy, wherein the molten silicon alloy reacts with some carbon in the targeted area of the MI-CMC component to form some silicon carbide. Further, the MI-CMC component is cooled to a temperature below 1385° C.

Further aspects of the present disclosure are provided by the subject matter of the following clauses:

A method of limiting void formation in a melt-infiltrated ceramic matrix composite (MI-CMC) component, the method comprising: arranging one or more infiltration sources in fluid communication with a targeted area of the MI-CMC component, the one or more infiltration sources having a nominal melting point at or below a nominal melting point of an alloy within the MI-CMC component; heating the one or more infiltration sources to a first temperature at or above the nominal melting point of the one or more infiltration sources to form a molten phase; infiltrating the targeted area of the MI-CMC component with the molten phase, wherein the molten phase reacts with a solid phase in the targeted area of the MI-CMC component; and cooling the MI-CMC component to a second temperature that is below the first temperature to solidify the molten phase.

The method of any preceding clause, wherein the one or more infiltration sources comprise one or more infiltrant feedstocks containing a silicon-based material and an infiltrant pre-alloyed material.

The method of any preceding clause, further comprising: saturating a wick with the molten phase of the one or more infiltrant feedstocks to form a saturated wick; cooling the wick below a melting point of the alloy to transition the alloy in the molten phase to a solid phase of the alloy; and arranging the saturated wick in fluid communication with the targeted area of the MI-CMC component.

The method of any preceding clause, further comprising delivering the molten phase to the targeted area of the MI-CMC component before the wick can draw molten alloy from the MI-CMC component creating additional porosity.

The method of any preceding clause, wherein the silicon-based material is an infiltrant powder mixture comprising at least one of silicon or a silicon alloy and an additive material.

The method of any preceding clause, wherein the additive material comprises a boron-containing additive material.

The method of any preceding clause, wherein the nominal melting point of the one or more infiltration sources is less than about 1400 degrees Celsius (° C.).

The method of any preceding clause, wherein the MI-CMC component is a part of a gas turbine engine.

A system for limiting void formation in a melt-infiltrated ceramic matrix composite (MI-CMC) component, the MI-CMC component having a targeted area needing infiltration, the system comprising: one or more infiltration sources having a nominal melting point at or below a nominal melting point of an alloy within the MI-CMC component; and a heat source for heating the one or more infiltration sources to a first temperature to form a molten phase; wherein, when the one or more infiltration sources is placed in fluid communication with the targeted area, the molten phase infiltrates and reacts with a solid phase within the MI-CMC component at the targeted area, and wherein the MI-CMC component is cooled to a second temperature that is below the first temperature to solidify the molten phase.

The system of any preceding clause, wherein the one or more infiltration sources comprise at least one of a wick saturated with the molten phase or one or more infiltrant feedstocks containing a silicon-based material and an infiltrant pre-alloyed material, and wherein the silicon-based material is an infiltrant powder mixture comprising at least one of silicon or a silicon alloy and an additive material.

The system of any preceding clause, wherein the additive material comprises a boron-containing additive material.

A method of limiting void formation in a melt-infiltrated ceramic matrix composite (MI-CMC) component, the method comprising: saturating a wick with a material in a molten phase; cooling the saturated wick below a melting point of the material to transition the molten phase of the material to a solid phase; arranging the saturated wick in fluid communication with a targeted area of the MI-CMC component; heating the saturated wick to a first temperature at or above the melting point of the material to return the solid phase of the material to the molten phase; infiltrating the targeted area of the MI-CMC component with the molten phase, wherein the molten phase of the material reacts with a solid phase of another material in the targeted area of the MI-CMC component; and cooling the MI-CMC component to a second temperature that is below the first temperature to solidify the molten phase.

The method of any preceding clause, further comprising: providing a first infiltrant feedstock; and arranging the saturated wick between the first infiltrant feedstock and the targeted area.

The method of any preceding clause, wherein the first infiltrant feedstock comprises a first silicon-based material having a first nominal melting point, and wherein the saturated wick comprises a second silicon-based material having a second nominal melting point, the first nominal melting point being greater than or equal to the second nominal melting point.

The method of any preceding clause, wherein the first infiltrant feedstock has a first nominal melting point, the method further comprising: forming a second infiltrant feedstock having a second nominal melting point.

The method of any preceding clause, further comprising arranging the second infiltrant feedstock in fluid communication with the first infiltrant feedstock, wherein the second nominal melting point of the second infiltrant feedstock is lower than the first nominal melting point of the first infiltrant feedstock to induce melting of the first infiltrant feedstock before the first infiltrant feedstock is heated to the first nominal melting point.

The method of any preceding clause, further comprising: forming the first infiltrant feedstock of an infiltrant powder mixture and an infiltrant pre-alloyed material.

The method of any preceding clause, wherein the infiltrant powder mixture comprises a silicon-based powder and a boron-containing additive material.

The method of any preceding clause, further comprising arranging an unsaturated wick adjacent to the saturated wick.

The method of any preceding clause, wherein the MI-CMC component is part of a gas turbine engine.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of limiting void formation in a melt-infiltrated ceramic matrix composite (MI-CMC) component, the method comprising:

arranging one or more infiltration sources in fluid communication with a targeted area of the MI-CMC component, the one or more infiltration sources comprising an infiltrant having a nominal melting point at or below a nominal melting point of an alloy within the MI-CMC component, wherein the one or more infiltration sources comprises a saturated wick, the saturated wick comprising a wick saturated with a solid phase of the infiltrant;

heating the one or more infiltration sources to a first temperature at or above the nominal melting point of the infiltrant to transition the solid phase of the infiltrant to a molten phase of the infiltrant;

infiltrating the targeted area of the MI-CMC component with the molten phase of the infiltrant; and cooling the MI-CMC component to a second temperature that is below the first temperature to solidify the molten phase of the infiltrant.

2. The method of claim 1, wherein the one or more infiltration sources comprise one or more infiltrant feedstocks containing a silicon-based material and an infiltrant pre-alloyed material.

3. The method of claim 1, further comprising:

saturating the wick with a molten phase of the one or more infiltrant feedstocks to form the saturated wick; and cooling the saturated wick below a melting point of the infiltrant to transition the infiltrant to the solid phase of the infiltrant.

4. The method of claim 3, further comprising delivering the molten phase of the infiltrant to the targeted area of the MI-CMC component before the wick can draw a molten form of the alloy from the MI-CMC component creating additional porosity.

5. The method of claim 2, wherein the silicon-based material is an infiltrant powder mixture comprising at least one of silicon or a silicon alloy and an additive material.

6. The method of claim 5, wherein the additive material comprises a boron-containing additive material.

7. The method of claim 1, wherein the nominal melting point of the infiltrant is less than about 1400 degrees Celsius (° C.).

8. The method of claim 1, wherein the MI-CMC component is a part of a gas turbine engine.

9. A system for limiting void formation in a melt-infiltrated ceramic matrix composite (MI-CMC) component, the MI-CMC component having a targeted area needing infiltration, the system comprising:

one or more infiltration sources comprising a material having a nominal melting point at or below a nominal melting point of an alloy within the MI-CMC component; and a heat source for heating the one or more infiltration sources to a first temperature to transition a solid phase of the material to a molten phase of the material;

wherein, when the one or more infiltration sources with the material in the solid phase is placed in fluid communication with the targeted area and heated with the heat source, the molten phase infiltrates the MI-CMC component at the targeted area, and wherein the MI-CMC component is cooled to a second temperature that is below the first temperature to solidify the molten phase of the material.

10. The system of claim 9, wherein the one or more infiltration sources comprise a wick saturated with one or more infiltrant feedstocks containing a silicon-based material and an infiltrant pre-alloyed material, and wherein the silicon-based material is an infiltrant powder mixture comprising at least one of silicon or a silicon alloy and an additive material.

11. The system of claim 10, wherein the additive material comprises a boron-containing additive material.

12. A method of limiting void formation in a melt-infiltrated ceramic matrix composite (MI-CMC) component, the method comprising:

saturating a wick with a material in a molten phase;

cooling the saturated wick below a melting point of the material to transition the molten phase of the material to a solid phase;

arranging the saturated wick in fluid communication with a targeted area of the MI-CMC component;

heating the saturated wick to a first temperature at or above the melting point of the material to return the solid phase of the material to the molten phase;

infiltrating the targeted area of the MI-CMC component with the molten phase, wherein the molten phase of the material reacts with a solid phase of another material in the targeted area of the MI-CMC component; and cooling the MI-CMC component to a second temperature that is below the first temperature to solidify the molten phase.

13. The method of claim 12, further comprising:

providing a first infiltrant feedstock; and arranging the saturated wick between the first infiltrant feedstock and the targeted area.

14. The method of claim 13, wherein the first infiltrant feedstock comprises a first silicon-based material having a first nominal melting point, and wherein the saturated wick comprises a second silicon-based material having a second nominal melting point, the first nominal melting point being greater than or equal to the second nominal melting point.

15. The method of claim 13, wherein the first infiltrant feedstock has a first nominal melting point, the method further comprising:

forming a second infiltrant feedstock having a second nominal melting point.

16. The method of claim 15, further comprising arranging the second infiltrant feedstock in fluid communication with the first infiltrant feedstock, wherein the second nominal melting point of the second infiltrant feedstock is lower than the first nominal melting point of the first infiltrant feedstock to induce melting of the first infiltrant feedstock before the first infiltrant feedstock is heated to the first nominal melting point.

17. The method of claim 13, further comprising:

forming the first infiltrant feedstock of an infiltrant powder mixture and an infiltrant pre-alloyed material.

18. The method of claim 17, wherein the infiltrant powder mixture comprises a silicon-based powder and a boron-containing additive material.

19. The method of claim 12, further comprising arranging an unsaturated wick adjacent to the saturated wick.

20. The method of claim 12, wherein the MI-CMC component is part of a gas turbine engine.

* * * * *